United States Patent [19]

Beland

[11] Patent Number: 5,391,977
[45] Date of Patent: * Feb. 21, 1995

[54] REGULATED X-RAY POWER SUPPLY USING A SHIELDED VOLTAGE SENSING DIVIDER

[75] Inventor: Robert Beland, Bellefeuille, Canada

[73] Assignee: Electromed InternationaL, Quebec, Canada

[*] Notice: The portion of the term of this patent subsequent to Jun. 11, 2008 has been disclaimed.

[21] Appl. No.: 72,720

[22] Filed: Jun. 4, 1993

Related U.S. Application Data

[60] Division of Ser. No. 931,899, Aug. 18, 1992, Pat. No. 5,241,260, which is a continuation of Ser. No. 467,658, Jan. 19, 1990, abandoned, which is a continuation-in-part of Ser. No. 447,559, Dec. 7, 1989, Pat. No. 5,023,769, Ser. No. 447,388, Dec. 7, 1989, Pat. No. 5,056,125, and Ser. No. 447,389, Dec. 7, 1989, abandoned.

[51] Int. Cl.⁶ ............................................. H05G 1/32
[52] U.S. Cl. ..................................... 323/268; 378/112
[58] Field of Search ................. 378/91, 112, 101, 194; 323/268, 270, 271

[56] References Cited

U.S. PATENT DOCUMENTS

| | | |
|---|---|---|
| 3,551,788 | 12/1970 | Summer . |
| 4,034,283 | 1/1977 | Pellegrino ............................. 323/74 |
| 4,119,856 | 10/1978 | Franke ............................. 250/402 |
| 4,200,795 | 4/1980 | Kawamura et al. ................. 250/402 |
| 4,274,003 | 6/1981 | Kuehnel et al. ..................... 250/409 |
| 4,277,683 | 7/1981 | Schmitmann ....................... 250/402 |
| 4,400,660 | 8/1983 | Schaefer ............................. 323/270 |
| 4,412,183 | 10/1983 | Brodie ................................. 330/68 |
| 4,449,227 | 5/1984 | Osako ................................. 378/112 |
| 4,670,893 | 6/1987 | Tsuchiya ........................... 378/105 |
| 4,731,803 | 3/1988 | Kranberg et al. ................... 378/114 |
| 4,739,466 | 4/1988 | Glennon et al. ...................... 363/89 |
| 4,796,286 | 1/1989 | Ochmann et al. ................. 378/108 |
| 4,816,741 | 3/1989 | Ekstrand ............................. 323/297 |
| 4,870,534 | 9/1989 | Harford ................................. 361/58 |
| 5,008,913 | 4/1991 | Negle ................................. 378/105 |
| 5,023,769 | 6/1991 | Beland ................................. 378/112 |
| 5,056,125 | 10/1991 | Beland ................................. 378/101 |
| 5,070,538 | 12/1991 | Milberger et al. ................. 323/270 |
| 5,132,999 | 7/1992 | Wirth ................................. 378/101 |
| 5,241,260 | 8/1993 | Beland ................................. 323/270 |

FOREIGN PATENT DOCUMENTS

| | | | |
|---|---|---|---|
| 02793317 | 8/1988 | Germany ................... H05G 1/08 |
| 55-151794 | 11/1980 | Japan ......................... H05G 1/14 |
| 61-27099 | 2/1986 | Japan ......................... H05G 1/34 |
| 220785 | 8/1924 | United Kingdom ................. 323/370 |

Primary Examiner—Jeffrey L. Sterrett
Attorney, Agent, or Firm—Wolf, Greenfield & Sacks

[57] ABSTRACT

A high-voltage power supply and regulator circuit for an X-ray tube which utilizes solid-state switching devices with feed-back control for real-time monitoring and protection against voltage spikes. More specifically, the regulator circuit utilizes a feedback control loop and a series of FET to produce a continuous or pulsed output of predetermined duration and/or amplitude. Shielded voltage dividers are provided to accurately measure the voltage output and produce feedback control signals. The shielded voltage divider includes a plurality of paired conductive members disposed along the length of a resistor, which paired conductive members separate the resistor into separate portions and provide alternating first and second pairs of conductive members along the length of the resistor. Still further, a capacitor series is provided, with each capacitor connected between adjacent first and second pairs of conductive members, and wherein the dynamic impedance of the capacitor series is less than the dynamic impedance of the resistor.

4 Claims, 7 Drawing Sheets

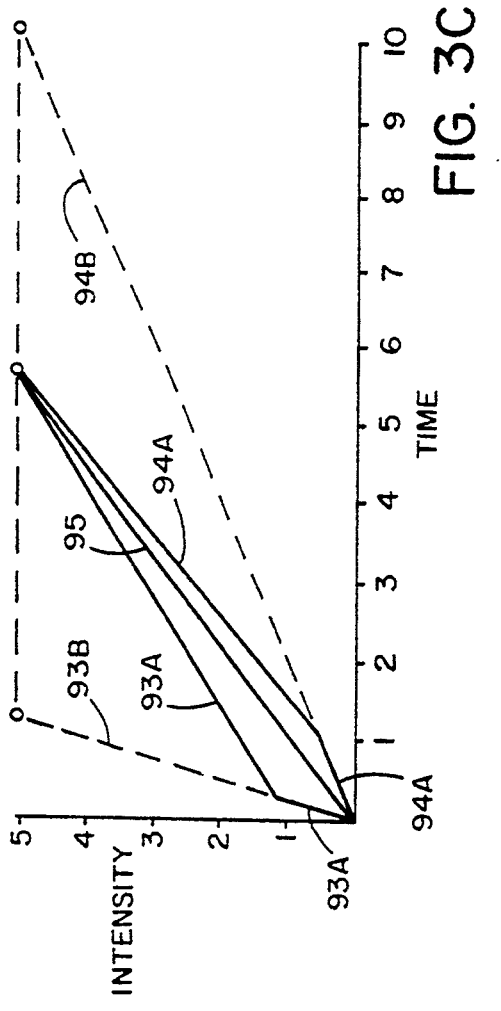
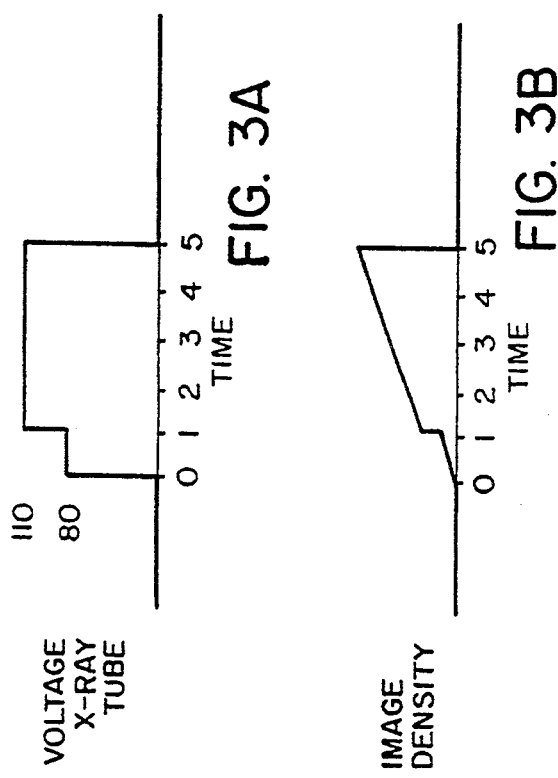

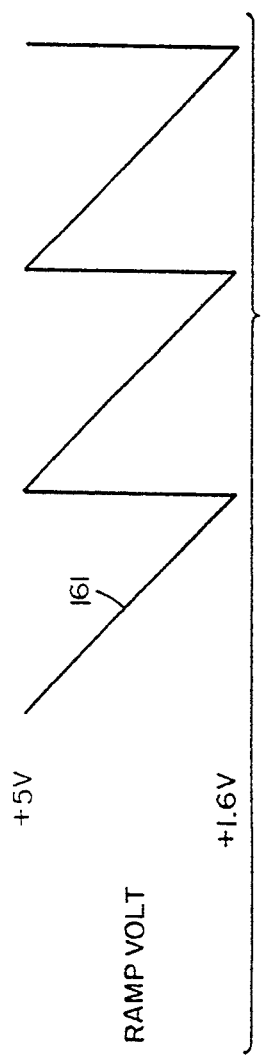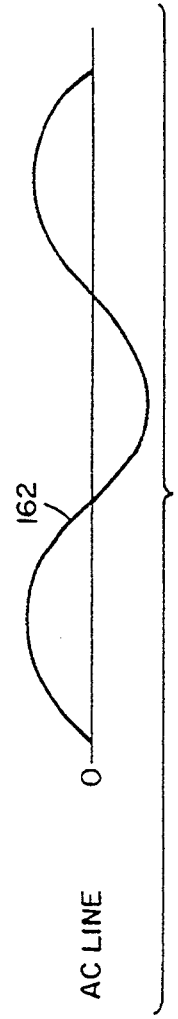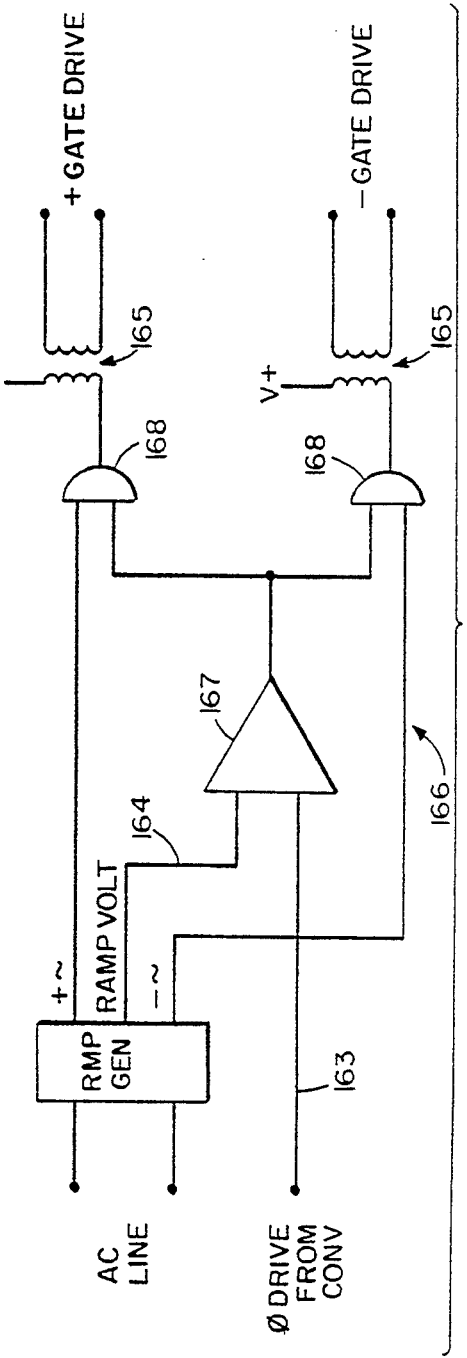

REGULATED X-RAY POWER SUPPLY USING A SHIELDED VOLTAGE SENSING DIVIDER

CROSS-REFERENCES TO RELATED APPLICATIONS

This application is a division of U.S. Ser. No. 07/931,899, filed Aug. 18, 1992, now U.S. Pat. No. 5,241,260, which is a continuation of U.S. Ser. No. 07/467,658, filed Jan. 19, 1990, now abandoned, which is a continuation-in-part of three commonly-owned applications filed on Dec. 7, 1989, by the same inventor: Ser. No. 07/447,559, now U.S. Pat. No. 5,023,769, entitled X-Ray Tube High-Voltage Power Supply With Control Loop And Shielded Voltage Divider; Ser. No. 07/447,388, now U.S. Pat. No. 5,056,125, entitled Discharge Module For X-Ray Cable; and Ser. No. 07/447,389, now abandoned entitled X-Ray Tube Current Measuring Apparatus. The subject matter of the above U.S. Pat. No. 5,241,260, which has been cancelled from the present application, is hereby incorporated by reference in its entirety.

BACKGROUND OF THE INVENTION

The present invention relates in general to an apparatus for powering X-ray tubes. In particular, the present invention uses solid-state switching and closed loop feedback control to automatically control the X-ray exposure. The invention may be correctly used by operators having a minimal skill level.

Typical high-voltage power supplies utilize vacuum tubes, variacs, auto transformers, tetrodes, and/or triodes for regulating the high-voltage output supplied to an X-ray tube. These devices have not been totally satisfactory due to their relatively high cost, slow response speed, lack of reliability, and/or their inability to provide a pulsed waveform having minimum ripple, fast rise time, and fast fall time. Prior attempts have been made to utilize solid-state switching devices, such as a series of field effect transistors (FETs), to regulate the high-voltage output. However, these have met with limited success because of the low-power rating of commercially available transistors and their inability to survive voltage spikes caused by an X-ray tube arc-over.

In a conventional X-ray tube, X-rays are produced by generating electrons by thermionic emission from a tungsten filament (cathode). The electrons are then accelerated to an anode (which may be rotating for wear-averaging purposes) to generate the X-rays. The emission intensity of the tube is controlled by the filament current and by the difference in potential between the anode and cathode.

Current X-ray tubes operate at potentials of up to 200 kV. A high-voltage power supply utilizing a step-up transformer is required to raise the available AC line voltage to this level. X-ray tube power supplies having a DC supply circuit, 90, as shown in FIG. 1 have been employed in prior known devices. The typical AC line voltage available in hospitals and clinics varies from single-phase 220 volts AC to three-phase 600 volts AC. An X-ray power supply able to operate from widely different line voltages, phases and impedances would be desirable in that line matching of the transformer to the specific AC line voltage characteristics would not be required.

Precise control of the voltage and phase of the power supplied to an X-ray tube is important to ensure proper imaging for diagnostic purposes and to avoid unnecessary exposure of the patient to X-ray radiation which does not produce a useable image. For example, during a conventional radiographic gastrointestinal analysis, the patient ingests a radioopaque liquid containing barium. When the patient ingests the liquid, the doctor turns on the X-ray generating tube at a low level and positions the patient between the X-ray tube and a fluoroscopic screen. The doctor analyzes the patient's gastrointestinal tract while the barium flows through it. When the doctor sees a part of the procedure he wants to record, he typically replaces the fluoroscopic screen with a photographic plate and increases the X-ray to a level intense enough to expose the plate.

High operating voltages make control of the X-ray tube emission level a difficult problem, typically requiring expensive components. Furthermore, at high tube currents the voltage can fall very quickly, making precise measurement of the voltage difficult. Still further, at high voltages stray capacitive coupling occurs which prevents accurate measurement of the tube voltage. Regulator circuits using FET's in series in X-ray tube power supplies have been employed in prior art devices. The combination of FET's in series regulator circuits with the protection, drive and feedback circuits of the embodiment of FIG. 1 is quite novel, however, and the specific configuration of the regulator circuit 91, FIG. 1, is also quite novel.

Precise phase control is also important when an X-ray image is to be recorded by a television camera. TV cameras have well-established sweep rates to which the X-ray exposure must be synchronized. If the exposure is not synchronized, the resulting picture from the TV camera has an interference pattern or jitters, which will make the picture very difficult or impossible to view. An exposure synchronized with the 60 Hz sweep rate of the TV camera will produce a coherent picture. It is also permissible to use X-ray exposures of less frequent multiples of the 60 Hz rate, for example, 30, 15 or 7.5 Hz.

Single-phase and three-phase power supplies each have certain advantages, depending upon the exposure rate desired. For example, three-phase power supplies are commonly employed to provide continuous X-ray emissions, because the voltage ripple in the rectified signal is smaller. Filtering capacitors to eliminate ripple are generally impractical at the high voltages employed and interfere with switching on-off times. In contrast, single-phase supplies are generally used to provide a short pulsed emission.

It would thus be desirable to provide a high-voltage power supply for both continuous and pulsed X-ray emissions which provides a precisely controlled output voltage and which accommodates variations in the input AC line voltage.

When an X-ray tube is being used for applications such as cardiac angiography, the X-ray tube is operated in relatively short bursts at a relatively high frequency in order to obtain clear images and to be able to monitor heart activity and detect any abnormalities. Typically, the tube is operated at approximately 8 ms bursts.

The relatively small X-ray tube current produced with pulsed fluroscopy does not sufficiently discharge the capacitance of the high-voltage cables connecting the power supply and X-ray tube between exposure frames. The "tail" on the power supply output waveform produces unwanted soft radiation which adds to the patient dose and does not improve the image. It would thus be desirable to provide a high-voltage power supply for an X-ray tube which produced substantially rectangular waveforms without a trailing tail of unwanted soft radiation.

In a conventional technique for measuring the X-ray tube current, the anode and cathode power supply lines are separated, with one supply return tied to ground and the other supply return tied to ground through a small value resistor in order to measure the "midpoint" current. However, the accuracy of this measurement technique is adversely affected by high-tension transformer leakage current and various stray capacitive currents. It would be desirable to provide an apparatus for precisely measuring X-ray tube current which is not affected by these leakage and stray capacitive currents.

It is generally difficult to measure the true X-ray tube current with a measuring circuit placed in either the anode or the cathode circuit because these circuits are both at potentials of up to 100 kV away from ground and there is no low-voltage power supply available. It would be desirable to provide a measuring circuit which is powered by the X-ray tube current it is measuring and which is capable of sending accurate information across the 100 kV boundary.

Still further, although X-ray tube currents for pulsed fluoroscopy may be relatively small, i.e., 0.5 milliamps (ma), X-ray tube currents may be as high as 1200 ma during full exposures. The X-ray tube current thus ranges from 0.5 ma to 1200 ma. As a result, the measuring circuit must be linear over a 2400 to 1 dynamic range. It would be desirable to provide a current measuring apparatus which is linear over this dynamic range and which operates with only 0.5 ma available as a supply current.

As noted above, the use and control of high-voltage power is inherent in the operation of conventional X-ray tubes. As such, various circuit components which are the same or similar to a variety of individual components shown in the Figures such as voltage divider 5, filament drive 73, current measurer 320 and discharge modules 210A, B, FIG. 1, have been employed in prior X-ray power supply devices. The combination of such components and the configuration of such components and the configurations of elements such as 210 as in the present invention is quite novel, however.

Thus, it is an object of this invention to provide a high-voltage regulated power supply for an X-ray tube that provides a precisely controlled voltage waveform in order to avoid overexposing the patient to excessive radiation or underexposing the X-ray image.

Another object is to provide a regulated power supply utilizing solid-state switching devices having a fast response time to enable real time control of the patient X-ray dosage.

Yet another object is to provide a regulated power supply having protective circuitry to guard against damage from excessive current or voltage transients.

Still another object is to provide an X-ray apparatus that automatically adjusts X-ray exposure without the aid of an X-ray technician to assure properly exposed X-ray images for patients having widely varying body sizes.

Still another object is to provide an X-ray apparatus that can automatically adjust X-ray exposure during the actual exposure time.

Still another object is to provide an X-ray apparatus in which X-ray tube current and voltage may be adjusted under load.

SUMMARY OF THE INVENTION

The apparatus of this invention utilizes solid-state switching devices with feedback control for producing a precisely regulated output voltage waveform. The apparatus includes a DC supply circuit utilizing a first feedback control loop and silicon controlled rectifiers to regulate the output of a high-voltage transformer. The apparatus further includes a regulator circuit utilizing a second feedback control loop and a series of field effect transistors (FETs) to produce a continuous or pulsed output of precise magnitude and phase. Shielded voltage dividers are provided for accurately measuring the voltage outputs of the high-voltage transformer and FET series and producing the feedback control signals. The FET series is protected against transient voltage spikes caused by tube arc-over. Any capacitive voltage remaining on the high-voltage cables connecting the power supply and X-ray tube is discharged between pulses to produce a pulsed waveform having a fast fall time. A current measuring apparatus is provided at the output of the high-voltage transformer to protect against excessive tube current and to provide current feedback information for use in controlling the X-ray tube current.

Additional feedback for controlling the DC supply and regulator circuits is derived from an X-ray exposure sensor placed behind the patient receiving the X-ray radiation. The sensor measures the amount of radiation passing through the patient and reaching the film or other imaging device. The output of the sensor is integrated to produce an exposure rate curve. At one or more times during the exposure, this curve is monitored to determine whether the optimum exposure rate will be achieved, and if not the output of the power supply is modified to approach the desired rate.

BRIEF DESCRIPTION OF THE DRAWINGS

FIGS. 3A–3C are graphs showing the variation of X-ray exposure with time according to this invention so as to optimize the exposure rate.

FIGS. 6A–6B are waveforms associated with the input phase control to the DC supply circuit.

FIG. 7 is a more detailed diagram of the solid-state switching devices for accomplishing the input phase control.

DETAILED DESCRIPTION OF THE PREFERRED EMBODIMENTS

1. The Complete High-Voltage Supply and Regulator Circuit

Figure 1:
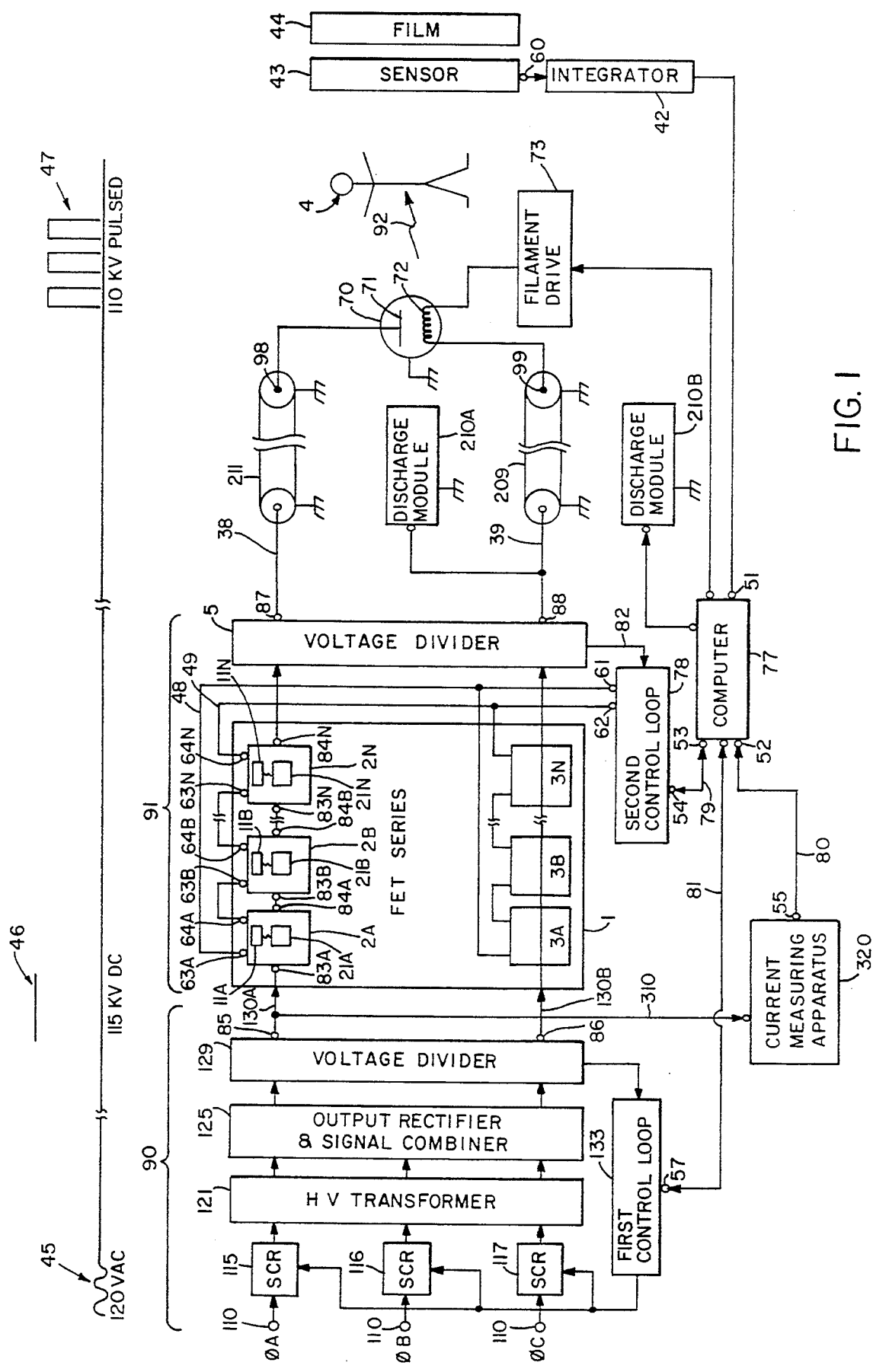
FIG. 1 is a block diagram of a high-voltage power supply and regulator circuit constructed in accordance with the present invention.

FIG. 1 is a block diagram showing an embodiment of a complete high-voltage power supply and regulator circuit according to the invention. The circuit is designed to limit the amount of X-ray exposure delivered to a patient 4 while providing a high-quality X-ray image. The image may be provided on film 44 as shown or, alternatively, on a TV screen or other imaging device with appropriate synchronization and interface apparatus.

The circuit utilizes a solid-state regulation system to control the high-voltage signal, e.g., 30,000 to 200,000 volts, provided to an X-ray tube. The regulation system is able to utilize FET power transistors that have only a 500 to 1,000 volt rating, the maximum commercially available, by connecting the power transistors in series and by providing protective circuitry that prevents a chain failure if one device fails. In addition, protective circuitry detects the transistor chip temperature, the maximum load current, and limits the dissipated power on a shorted load. The system is also designed to assure proper voltage balance between all devices under static and dynamic conditions.

X-ray tubes have a tendency to arc-over, which produces an extremely fast voltage discharge and severe standing waves in the coaxial cables connecting the regulator circuit to the X-ray tube. These standing waves cause the voltage to double for a short time and reverse in polarity. This effect must be isolated from the regulator or the chain of power transistors utilized in this invention could not remain in balance and could not survive the instantaneous overvoltage.

As shown in FIG. 1, the system includes the following circuit portions connected in series between input terminals 110 and X-ray tube 70: a DC supply circuit 90 having a first feedback control loop 133; a regulator circuit 91 having a second feedback control loop 78; a current measuring circuit 320 between the supply circuit 90 and regulator circuit 91; and a pair of discharge modules 210A and 210B on coaxial cables 211 and 209 connected to the X-ray tube. The feedback control loops include a shielded voltage divider for supplying an accurate low-voltage feedback signal and protective devices to prevent damage to the solid-state switching devices from transient voltage spikes or reversals of polarity. The X-ray tube 70 transmits an X-ray signal 92 to a patient 4 who is positioned between the X-ray tube and an X-ray exposure sensor 43, with film 44 disposed on the opposite side of sensor 43. The sensor 43 sends a feedback signal to computer 77 via integrator 42 which indicates the total X-ray exposure passing through the patient and reaching film 44 for producing an X-ray image. The current measuring apparatus 320 monitors the current in the X-ray tube and sends a feedback signal to the computer 77 to prevent excessive current from damaging the DC supply and regulator circuits or the X-ray tube and provides accurate feedback information used by the system to precisely control the X-ray tube current. The computer 77 in turn controls the first control loop 133, second control loop 78, discharge modules 210A and 210B, and filament drive 73. Filament drive 73 determines the current in the cathode filament and thus, along with the potential across the anode 71 and cathode 72, determines the magnitude of the X-ray exposure signal 92.

As shown at the top of FIG. 1, an input signal 95, which may be, for example, a three-phase sinusoidal 120 V AC signal, is input at terminals 110. The output of the DC supply at terminals 85, 86 is a stepped-up constant voltage signal 46 of for example 115 kV. The output at terminals 98, 99 of the high-voltage cables may be any continuous or intermittent (pulsed, sinusoidal, triangular, or the like) waveform as determined by the desired X-ray exposure, such as a pulsed 110 kV DC signal 47. The signal 46 is generally set slightly above the desired output signal 47 to account for any losses in the system.

The various portions of the apparatus of this invention are described below under separate subheadings.

2. The Regulator Circuit and Second Control Loop

As shown in FIG. 1, a high-voltage DC signal 46 at terminals 85, 86 is fed to FET series 1, consisting of a first series of regulator modules 2A–2N on the positive (anode) line 38 and a second series of modules 3A–3N on the negative (cathode) line 39. The voltage across the two lines is floating, with neither line tied to ground. The quantity of modules is determined by the maximum input voltage 46 divided by the breakdown voltage of each module, with some additional modules added for a safety margin.

Each of modules 2A–2N and 3A–3N functions as a variable high-voltage power zener with two terminal isolation. The modules are provided in series so that if one module fails, that failure does not render the other modules inoperative. If one module fails, the total voltage from input to output of the regulator series is divided between all of the other modules. The following description will refer to the FET series 2A–2N, where it is understood that the series 3A–3N operates in an identical manner.

The modules 2A–2N are driven in series by an input current of from 0 to 100 ma received from the second control loop 78, which loop may be a digital control loop so that the control loop may respond with the required speed. The voltage across each module varies from about 10,000 volts to 0 volts, depending upon the input current. For a given input current, all of the modules in series (the functioning ones) share the voltage equally. A series circuit is formed by second control loop 78 and the series of modules 2A–2N. The output from the control loop 78 at terminal 61 is sent on line 48 and received in series at input terminals 63A–63N of modules 2A–2N. The serial output of modules 2A–2N at terminals 64A–64N is sent on line 49 to input terminal 62 on control loop 78.

Second control loop 78 and voltage divider 5 provided in the regulator circuit operate in substantially the same manner as first control loop 133 and voltage divider 129 provided in the DC supply circuit; the latter are described hereinafter under the subheading "DC Supply And First Control Loop." The voltage divider 5 provides a signal (on line 82) representative of the magnitude of the output voltage of FET series 1 to the second control loop 78 in order to provide feedback control for regulating the output of the FET series. The second control loop is connected via line 79 and terminal 54 to terminal 53 of computer 77. The computer 77 informs control loop 78 of the desired X-ray exposure rate, in order to adjust the output of regulator 91 at terminals 87, 88. It also instructs control loop 78 to terminate the output of regulator 91 when the X-ray exposure has been completed, or if excessive tube current is detected by module 210A or 210B.

Transient protection devices are provided for protecting FET series 1 from a reversal of polarity or a fast discharge rate voltage spike. These protection devices are described more fully hereinafter in conjunction with the shielded voltage divider 129. Clamp diodes are provided to prevent the modules from being submitted to a reverse polarity caused by an X-ray tube arc-over and any standing waves in the high-voltage cables 211, 209. To control the rate of a high-voltage discharge caused by an X-ray tube arc-over, an inductor/capacitor (LC) tuned circuit is provided on each of lines 38, 39 respectively to limit the transient voltage rate that the regulator sees to the resonant frequency of L/C. This is set for approximately 100,000 Hz resonance so as to limit the transient rise time to about 2.5 microseconds ($\mu s$) (as compared to about 0.002 $\mu s$ for an unmodified high-voltage spike). The inductors are of special design in order to withstand the 100,000 volt transient across them without arc-over. The inductor coil is wound to a length of approximately 12 inches with a few thousand turns. The voltage per turn is as low as about 100 volts per turn.

In order to reduce any "tail" on the pulsed DC waveform 47, which soft radiation adds to the patient dose without improving the image, a pair of discharge modules 210A, 210B are provided on each of the high-voltage cables 211, 209 between the FET series 1 and the X-ray tube 70. The operation of these devices is described hereinafter under the subheading "Discharge Modules."

Figure 2:
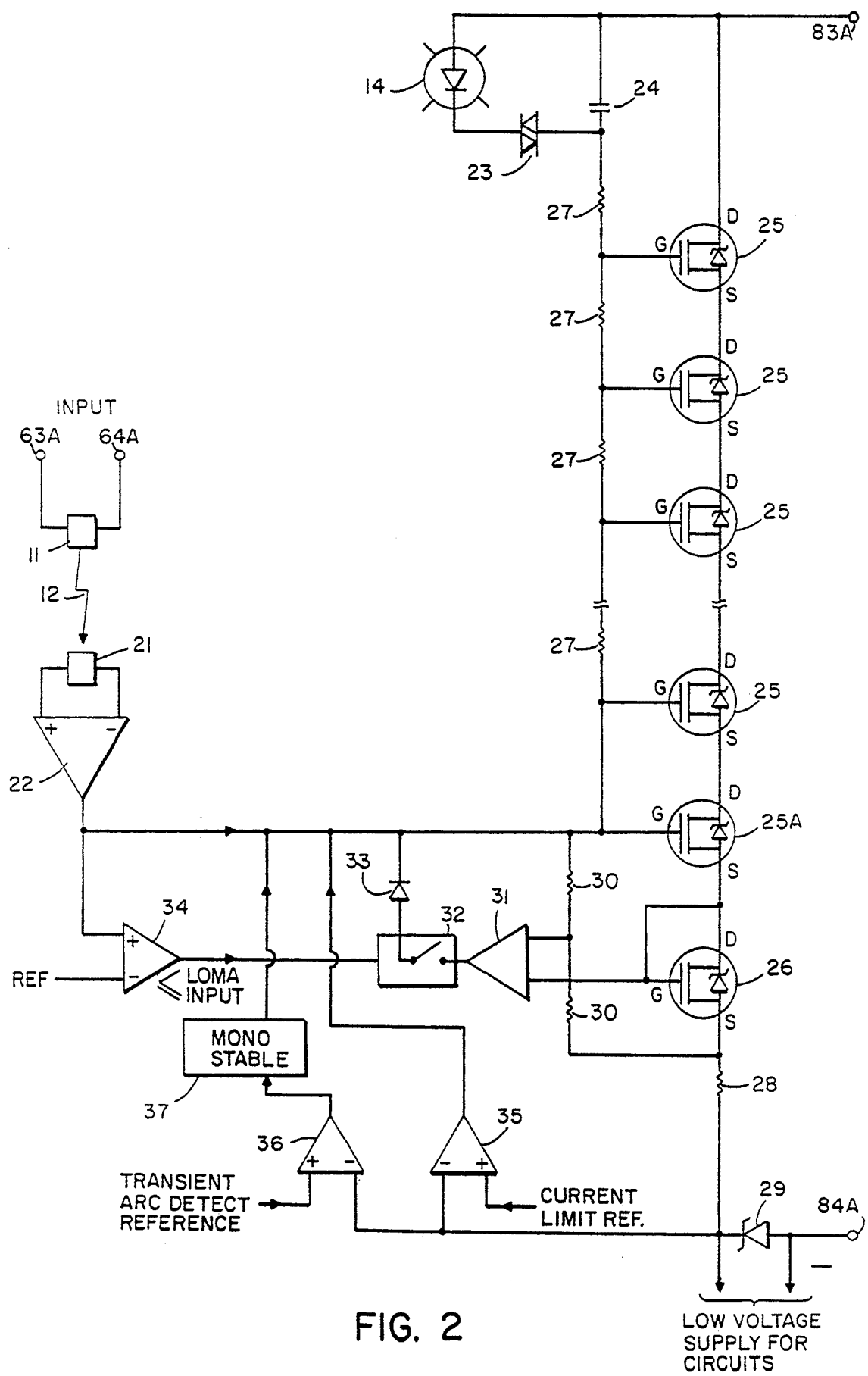
FIG. 2 is a detailed diagram of one module of the regulator and switching circuit.

As shown in FIG. 2, each of the modules 2A–2N and 3A–3N includes an electromagnetic (EM) coupling means 11 for isolating the low-voltage second control loop 78 from the high-voltage signal across the FET series. For example, it is shown in the art how to provide EM coupling at radio frequencies. The input current at terminal 63A activates an EM transmitting means 11. The EM signal 12 is coupled by appropriate means to an EM receiving means 21 which converts the EM signal into a current proportionally.

The current from receiving means 21 is amplified by amplifier 22 which in turns supplies current into a feedback and static-balancing resistor chain 27. The chain 27 is a feedback resistor from input terminal 83A to the gate G of a controlling transistor 25A, so that the voltage across terminals 83A, 84A is the product of the current generated by amplifier 22 times the sum of the resistances of all the resistors 27. All of resistors 27 have equal values, and therefore all transistors 25 have equal voltage across them. Each of transistors 25 and 25A is a field effect power transistor (FET).

When the drive current at terminals 63A, 64A exceeds a predetermined minimum, a comparator 34, which receives as inputs a reference signal and the output of amplifier 22, generates a signal to enable a "thermal limiter" which prevents the FET chips from exceeding a predetermined-temperature. When the junction temperature of transistor 25A reaches a predetermined value, the thermal limiter is actuated to limit the current through transistors 25 to a predetermined level. The enable signal of comparator 34 is required because at very low input drive currents, if the thermal limiter clamps the regulator to the predetermined current, control of the regulator from amplifier 22 is lost. Thus, if the drive signal from 11 was to be shut off, the regulator would not turn off. Comparator 34 senses when there is less than a predetermined minimum drive, and disables the thermal limiter.

The thermal limiter includes, as shown in FIG. 2: enable comparator 34; enable gate 32; low temperature blocking diode 33; thermal limiter comparator 31; and two bridge comparator resistors 30. While an FET has a known gate voltage change with temperature, the difficulty in compensating for this change lies in the fact that the gate voltage changes more with load (i.e., X-ray tube) current than with temperature. In order to eliminate the gate voltage/load current effect, another transistor 26 (of the same type as 25A) is provided in the chain and, by connecting the gate and drain of transistor 26 together, the power across 26 is very low because the voltage across the drain to source (i.e., across the device) is equal to the gate voltage. Because the load current also passes through 26 and 25A, the gate voltages of 25A and 26 are always equal. Therefore, the gate voltage of transistor 26 can be subtracted from the voltage at the junction of bridge resistors 30 connected to the gate of transistor 25A to give 0 reading.

This type of connection of transistor 26 cancels the large effect of changing gate voltage with changing load current. Consequently, the smaller effect of changing gate voltage with temperature can be detected by transistor 26. Transistor 26 effectively tracks the junction temperature of transistor 25A and may therefore be used to drive thermal limiter comparator 31 on when the gate voltage of transistor 26 exceeds the voltage at the junction of bridge resistors 30. The output of thermal limiter comparator 31, through enable gate 32 and blocking diode 33, effectively limits the drive voltage and current supplied to the gate of transistor 25A which in turn limits the current (and as a consequence the junction temperatures of) transistors 25.

The power dissipation of transistor 25A is large compared to that of transistor 26 because 25A sees part of the voltage across the output terminals 3A, 84A. The resultant difference of the gate voltages 25A and 26 is only the thermal junction temperature difference between 25A and 26. Because 26 has very small dissipation and does not heat, by sensing this difference with amplifier 31 and controlling 25A via gate 32 and blocking diode 33, the junction temperature of 26 is limited to the desired value, i.e., output of comparator 31=(thermal junction temperature difference of transistors 25A and 26)×(the gain of comparator 31).

Current limiting is accomplished by sensing the voltage across current sensing resistor 28, which is in series with the load current. When the load (i.e., X-ray tube) current reaches a predetermined minimum, the output of comparator 35 turns transistor 25A off, which in turn increases the voltage across terminals 83A and 84A. The current sense point is "soft" in that the predetermined current value starts to increase the voltage across terminals 83A and 84A to a predetermined maximum value. In the linear zone between the predetermined minimum X-ray tube current and maximum voltage across terminals 83A and 84A, the voltage remains balanced across all regulator modules when within the current limit.

During an X-ray tube arc-over, a transient current is present for a very short time, approximately 2.5 $\mu s$. This transient is sensed by amplifier 36 and triggers a monostable circuit device 37 for turning off the regulator for a given time. After this monostable delay, the regulator reverts to normal operation. The normal response time for the regulator is about 100 $\mu s$ maximum, and therefore amplifier 36 does not come into operation under normal conditions.

Zener diode 29 is in series with the load (X-ray tube) and serves to supply all of the low-voltage amplifiers around transistor 25A. When the module fails, the chain of transistors 25 acts as a short circuit (whether or not the module is on) between terminals 83A, 84A, except for a nominal voltage drop across diode 29. The remaining functioning modules then share the voltage equally.

Indicator 14 is a variable rate flasher which indicates the voltage present across terminals 83A, 84A. This provides the X-ray operator with a visual display on the proper functioning of each regulator module. Because each module shares the voltage equally, all indicators in each module should flash at the same rate. If not, one module is defective. The timing capacitor 24 is used to provide a signal to four-layer switching device 23 to control the on/off switching of indicator 14.

3. X-Ray Exposure Sensor

A sensor 43 is provided between patient 4 and film 44 for determining the amount of X-ray exposure emanating from the patient and exposing the film. As previously indicated, it is desired to minimize the X-ray exposure of the patient while still providing sufficient transmitted radiation for exposing the film. Sensor 43 is a conventional mechanism such as an image intensifier and associated mechanisms and emits at terminal 60 a signal proportional to the amount of X-rays passing through the patient. This signal is integrated by integrator 42 and sent to computer 77 at input terminal 51. The feedback from sensor 43 enables a readjustment of the X-ray signal sent to the patient one or more times during a given exposure in order to optimize the image produced on film 44 while limiting the total exposure of the patient. This is illustrated by the graphs shown in FIGS. 3A–3C.

FIG. 3A shows the voltage at the X-ray tube 70 versus time, the time scale being divided into five equal units. FIG. 3B shows an image density curve on the same time scale as FIG. 3A corresponding to an X-ray exposure using the X-ray tube voltages illustrated in FIG. 3A. FIG. 3C shows the X-ray intensity at sensor 43 versus time.

In a representative example, a person of average build, i.e., an-adult male weighing about 180 lbs, may receive the proper exposure, e.g., 5 units of intensity within 5 units of time (curve 95), with an X-ray tube voltage of 100 kV. A person of greater size would absorb more X-ray energy and thus not transmit sufficient energy for an optimum image at 5 units of time (curve 94B). In contrast, a person of smaller size would absorb less X-ray energy and transmit excessive X-ray energy to the film (curve 93B). Because the exact patient absorption cannot be determined beforehand simply on the basis of weight, it is desired to estimate the appropriate tube voltage, set the initial tube voltage slightly lower to avoid excess exposure, and then automatically readjust the tube voltage one or more times during the exposure as needed to approximate the ideal exposure.

In this example, where a patient is expected to have proper absorption at a 100 kV tube voltage, the initial tube voltage is set below that level, e.g., 80 kV at time zero. Sensor 43 designates when the received intensity is either one unit of intensity or one unit of time, whichever occurs first. As shown in FIG. 3C, for a smaller patient the intensity unit 1 would be reached first (curve 93A) and for a larger patient the time unit 1 would be reached first (curve 94A). In this example, the patient is larger than expected so the intensity unit 1 is reached first (curve 94A). As shown in FIG. 3A, the computer 77 then adjusts the voltage at the X-ray tube up to 110 kV in order to achieve the desired total exposure at time unit 5 (curve 94A). Graph 3B shows the film density achieved per unit of exposure time for the X-ray voltages used in FIG. 3A. Up to time unit 1, the slope rises too slowly, and is adjusted upwardly at time unit 1 to a higher slope in order to achieve the desired total exposure rate at time unit 5. In contrast, if no change was made, the total exposure rate would be optimum at time unit 10 as shown in FIG. 3C (curve 94B). Alternatively, for a smaller patient the optimum exposure rate would be achieved around time unit 1 (curve 93B). By thus modifying the exposure rate at one or more times during the exposure, an optimum image can be obtained with minimal exposure of the patient.

4. DC Supply and First Control Loop

The DC power supply 90 of this invention is adapted to operate from a variety of input AC line characteristics and provide a precisely controlled high-voltage output signal.

In accordance with this invention, the separate single-phase components of the input AC line voltage are separately controlled before being applied to the primary windings of a step-up transformer. The high-voltage output of the transformer is monitored and a low-voltage control signal is derived therefrom which is representative of the high-voltage output. The low-voltage control signal is digitally processed for generating a phase drive signal. The phase drive signal is used to control the outputs of separate solid-state switching devices, such as silicon controlled rectifiers, through which each of the single-phase input signals pass before being sent to the transformer. The digital processor is able to learn the characteristics of the input AC line voltage to generate an appropriate phase drive signal for the desired output voltage. The digital processor also measures the AC line impedance. The response time of the control loop is made a function of the X-ray tube current in order to accommodate variations in the speed of voltage changes with varying tube current.

A resistor divider is used to measure the high-voltage output of the power supply. Because of the high voltage being measured, the divider is shielded to enable accurate measurement over a wide frequency range. The shield consists of grounded conductive segments disposed along the length of the resistor, which segments are coupled to a capacitor series having a lower dynamic impedance than the resistor. Stray capacitance couples to the shield and pick-up to the resistor divider is only from adjacent shield portions which are at nearly the same potential. The divider thus behaves like a true 10,000 to 1 voltage divider at frequencies from DC up to about 50,000 Hz.

Figure 4:
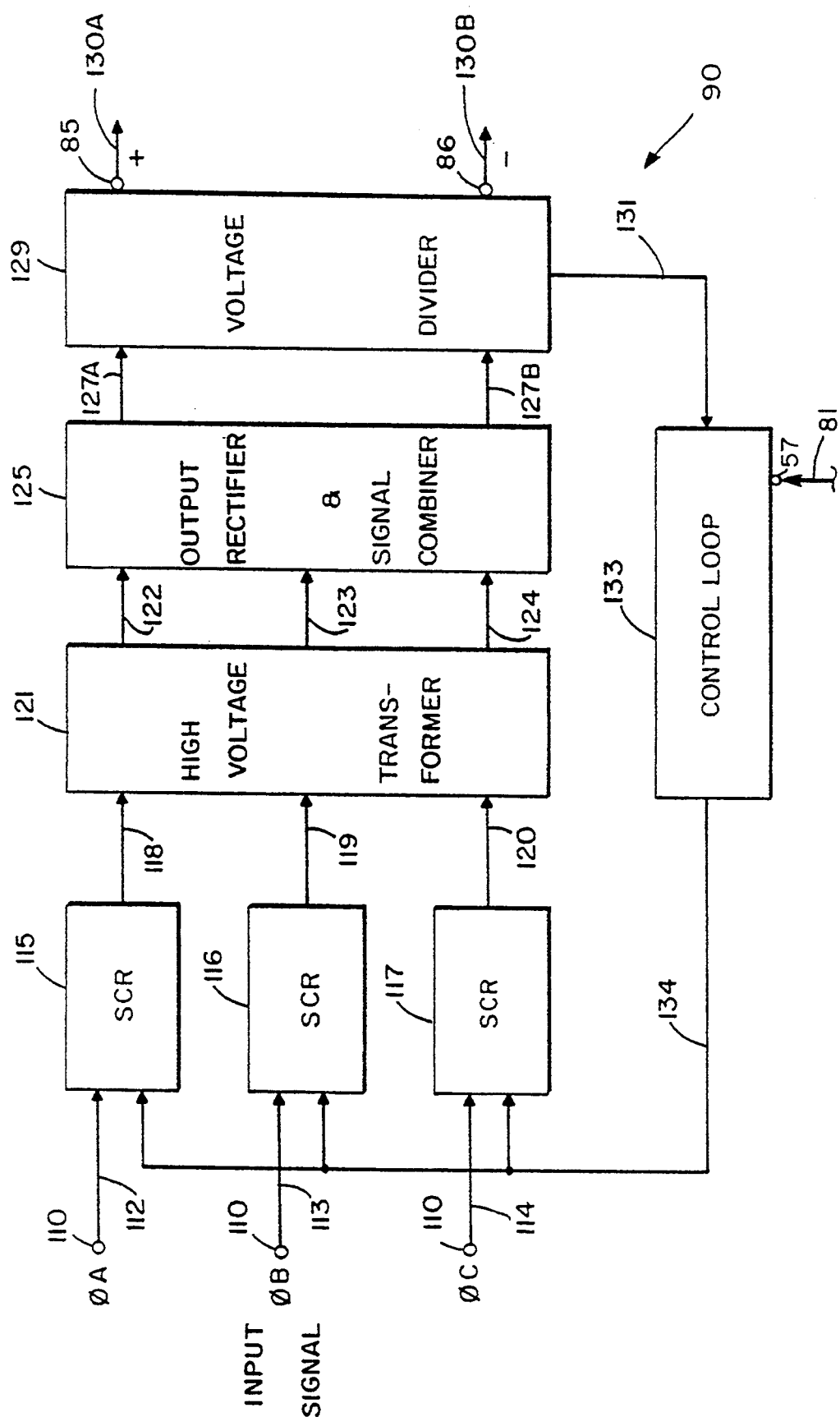
FIG. 4 is a block diagram of the DC supply circuit.

The DC supply circuit 90, as illustrated in the block diagram of FIG. 4, has an input signal applied at terminals 110 that can be a single or multiple-phase signal of unknown voltage. For the sake of simplicity, only signal lines are illustrated in FIG. 4; no grounds or shields are shown. It is understood that all phases of the input signal are referenced to the same ground.

In essence, each of input phase signals $\phi A$, $\phi B$, $\phi C$ is sent on a separate line 112, 113, 114 to a separate silicon controlled rectifier (SCR) 115, 116, 117, respectively. The outputs of the SCRs are sent on separate lines 118, 119, 120 to a low-voltage to high-voltage (or step-up) transformer 121 and from there on lines 122, 123, 124 to an output rectifier and signal combiner 125. The high-voltage output signal on lines 127A and 127B is applied to a voltage divider 129 which generates a control signal on line 131 proportional to the output voltage of rectifier 125 and that is processed by first control loop 133 and used to generate a phase drive signal sent on line 134 to each of the SCRs 115, 116, 117 for controlling which portions of the input phase signals $\phi A$, $\phi B$, $\phi C$ are sent to the transformer 121. By thus controlling the input to the transformer, the power supply of this invention can be used in hospitals and clinics having widely-ranging AC line characteristics, for example from single-phase 220 volts AC, to three-phase 600 volts AC. The high-voltage output of the power supply, sent on lines 130A and 130B to regulator 91, can be precisely controlled from about 30 kV to about 200 kV. Alternatively, the power supply output on lines 130 can be sent directly to the anode and cathode of an X-ray tube.

Figure 5:
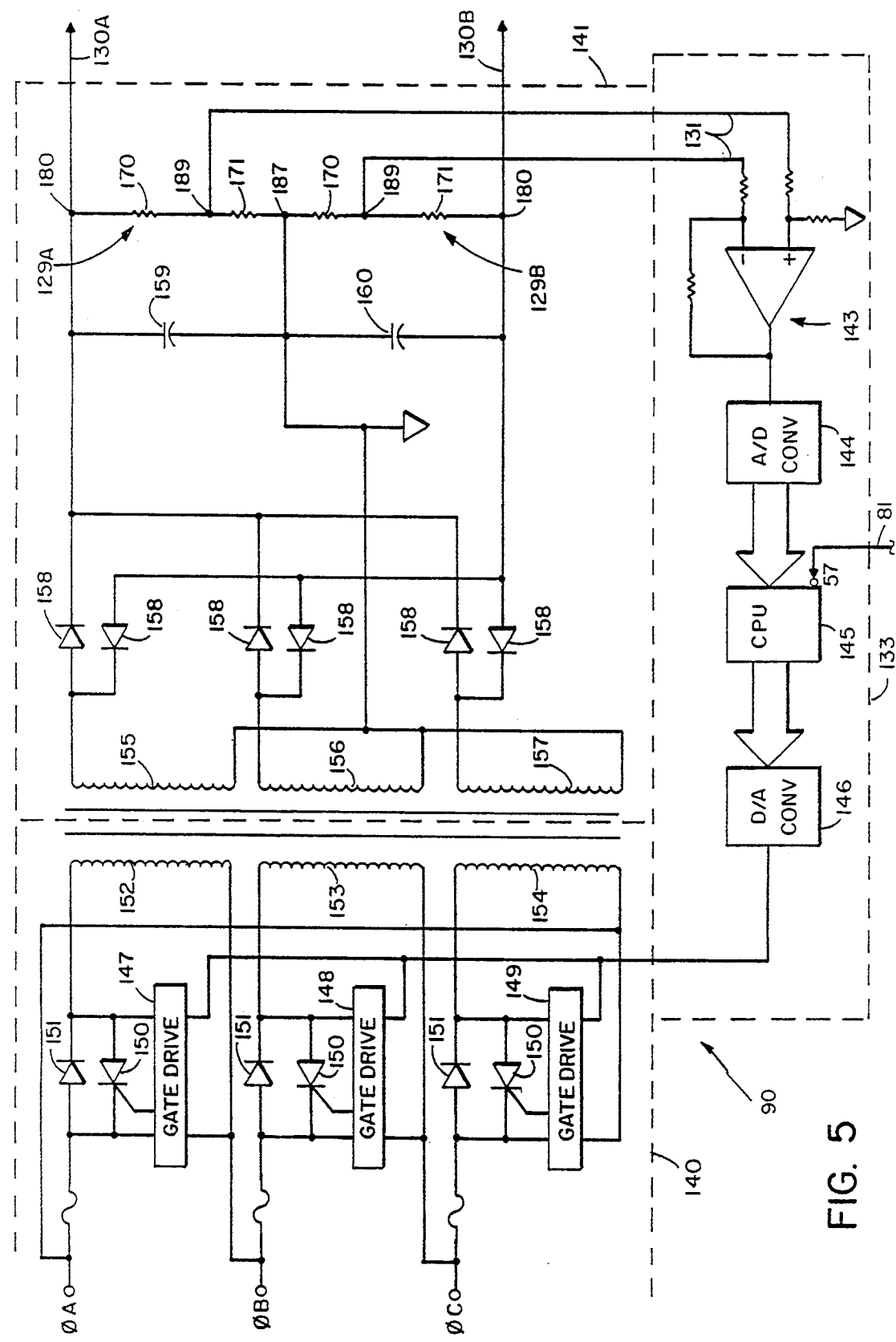
FIG. 5 is a more detailed diagram of the DC supply circuit.

FIG. 5 describes in greater detail an embodiment of the DC supply. The circuit includes three basic parts: a transformer primary circuit 140, a transformer secondary circuit 141, and a control loop 133. A high-voltage output signal sent on lines 130A and 130B is monitored by means of a voltage divider 129. A low-voltage control signal produced by the voltage divider and proportional to the voltage on lines 130 is sent on lines 131 in serial order to a difference amplifier 143 which amplifies the control signal, an analog-to-digital (A/D) converter 144 which converts the analog control signal to a digital control signal, and a central processing unit (CPU) 145 which, when programmed with the input kV required for the desired X-ray exposure (received at terminal 57 on line 81 from computer 77), furnishes a predetermined digital phase drive signal. The digital phase drive signal output by the CPU is sent to a digital-to-analog (D/A) converter 146 which converts it to an analog phase drive signal that is sent to gate drive circuits 147, 148, 149. Each gate drive circuit controls two silicon controlled rectifiers 150, 151 which supply input voltage to one of three primary windings 152, 153, 154 of the high-voltage transformer. The stepped-up voltage signals on the three secondary windings 155, 156, 157 of the transformer are rectified by a three-phase full-wave bridge comprising output rectifiers 158, filtered by two high-voltage capacitors 159, 160, and sent to voltage divider 129. The CPU, by continuously monitoring the voltage across lines 130A and 130B, controls the gate drive circuits to obtain optimum kV for the exposure.

As shown in FIGS. 6A–6B, each gate drive circuit includes a ramp generator which produces a ramp signal 161 that starts at +5 volts at the zero crossing of the AC single-phase sine wave 162 and ramps down to +1.6 volts at the half cycle. The phase drive signal on line 163 is compared with the ramp signal 161 on line 164 by comparator circuit 166 (FIG. 7), and each time the ramp signal goes below the phase drive signal the corresponding SCR receives a gate pulse through the pulse transformer 165. Comparator circuit 166 includes OR gate 167 followed by AND gates 168. Thus, a phase drive signal of 5.0 volts produces full conduction of the SCRs, a phase drive of 3.3 volts gives 90° of conduction, and a phase drive below 1.6 volts turns all SCRs off. Thus, by the use of phase control on the primary windings of the transformer, wide variations of the AC input line voltage can be accommodated to achieve a precisely controlled output voltage.

The secondary circuit 141 has one end of each transformer secondary winding 155, 156, 157 tied to ground. This enables the transformer primary to be wound directly on the transformer core (600 volts insulation) and then the secondary can be wound with no high-voltage insulation between the primary and the ground side of the secondary. This reduces the size of the core and of the transformer. The remainder of the secondary circuit consists of a six-phase, additive, full-wave bridge with each rectifier 158 shown consisting of 25 controlled avalanche rectifiers in series, followed by two capacitors 159, 160, and two 10,000 to 1 voltage dividers 129A and 129B. Each divider consists of three 20 meg ohm resistors 170 in series with a 6.04K ohm resistor 171 tied to zero volts DC. The large energy storing capacitors 159, 160, coupled with the input phase control, produce a stable output voltage with minimum ripple. The input AC line ripple, at two to six times the line frequency, is substantially eliminated.

The control loop 133 consists of converter circuits which provide the CPU 145 with feedback information on the input kV and allow the CPU to control the phase drive to the primary circuit. The control loop must function under the following difficult conditions: open loop gain which is highly non-linear; loop response which varies with line voltage and impedance; and loop response time which varies with X-ray tube current. Thus, during a preparation delay before an X-ray exposure, the software in the CPU monitors the relationship between the phase drive signal and the resulting high-voltage output signal to compensate for changes in the AC line. Variations in AC line impedance are measured during an exposure. After the power supply has performed about 15 X-ray exposures, the software has "learned" the line characteristics, stored them, and is able thereafter to predict the response of the loop. The closed loop control system, which includes software running on the computer, uses proportional, integral, and differential terms in order to optimize the overall performance. The integral term, which is comparable to loop response time, is made a function of the X-ray tube current because the voltage change varies with tube current. At a very high tube current the tube voltage can fall as much as 40 kV in 10 ms. In contrast, at very low tube currents, the 0.5 μF capacitors take ten seconds to drop 40 kV.

In order to obtain maximum performance from the closed loop control system, very accurate feedback information is required. This is difficult because the resistor divider is measuring potentials as high as 100 kV, which requires very high resistor values. Furthermore, relative potentials can change in the high-voltage tube circuit at rates as high as 1000 volts/microsecond and stray capacitive coupling to the voltage divider resistors makes accurate transient response of the closed loop difficult. A straight-forward resistor/capacitor divider would require one percent high-voltage capacitors which do not change with applied voltage, and such parts are not generally available.

The present invention thus uses a shielded resistor divider which prevents stray capacitance from adversely affecting the feedback information provided to the control loop. The circuit utilizes a series of nearly complete shields around the resistor divider with each shield tied dynamically to about the same potential as that part of the divider it is shielding. Stray capacitance is thus coupled to the shield and consequently, signal pick-up to the divider comes only from the adjacent shield at nearly the same potential. The divider thus behaves like a true 10,000 to 1 voltage divider at frequencies from DC up to about 50,000 Hz.

Figure 8:
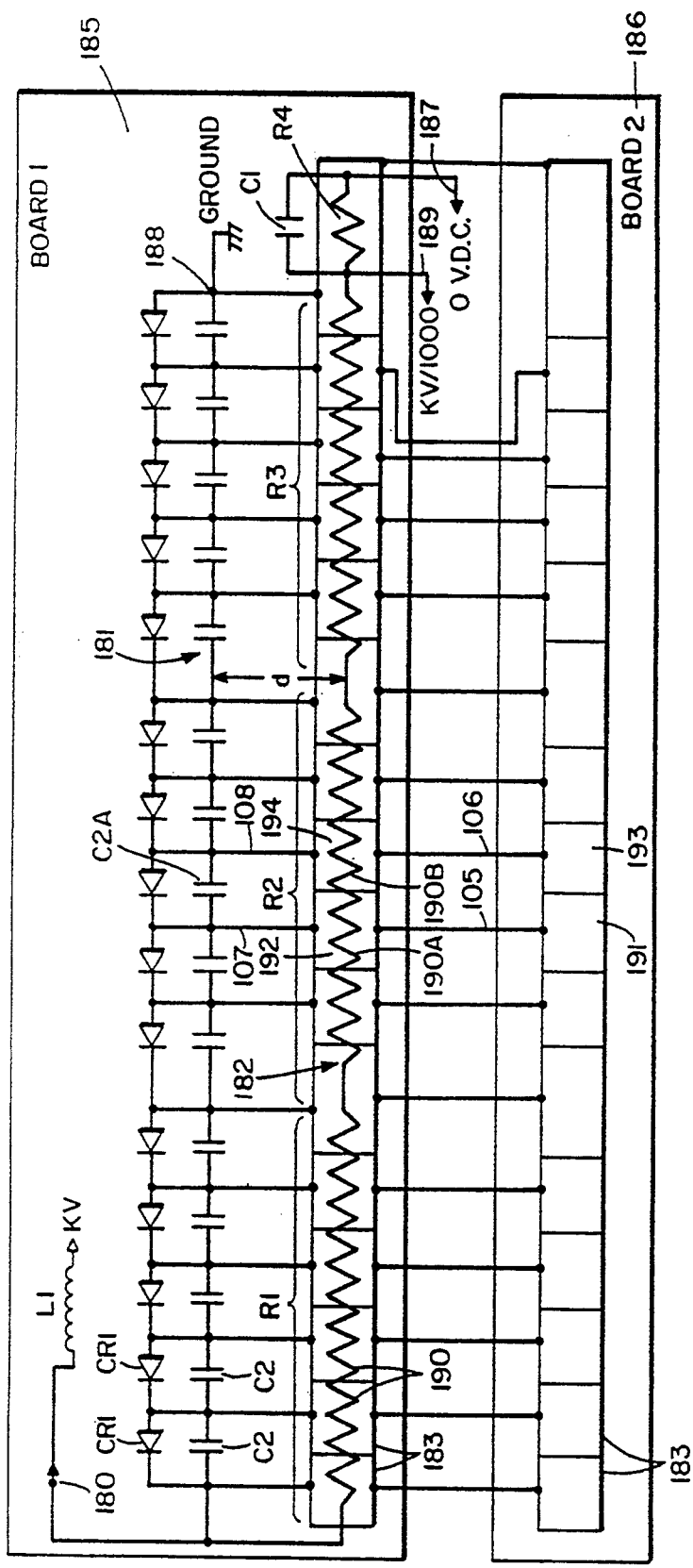
FIG. 8 is a schematic diagram of a shielded resistor divider circuit for measuring voltage in accordance with the present invention, showing top plan views of first and second boards.

As shown in FIG. 8, the divider itself consists of three high ohmic value resistors R1, R2, R3 in series with a low ohmic value resistor R4 tied to zero volts DC, forming resistor series 182. A capacitor C1 in parallel with resistor R4 provides a pole for infinite frequency gain at about 160 kHz, to eliminate high-frequency pick-up. The shield includes fifteen capacitors C2 in series, forming capacitor series 181. Fifteen diodes CR1 are provided in parallel with these capacitors to clamp the output voltage at terminal 180 to prevent the output voltage from reversing polarity during an X-ray tube arc. Conductive metallic shield segments 183 above and below the resistor divider 182 are coupled to the capacitor series 181 for dissipating stray capacitance.

Figure 9:
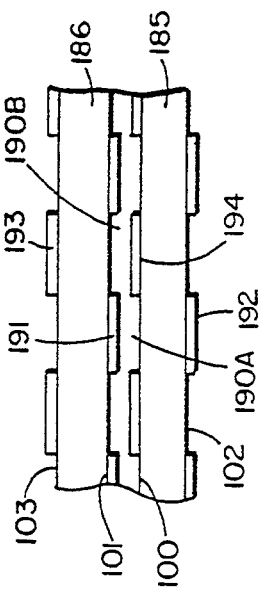
FIG. 9 is a schematic cross-sectional view of a portion of the shielded resistor divider of FIG. 8, showing the second board disposed above the first board.

FIG. 8 shows a top view of a first board 185 containing the resistor series 182, capacitor series 181 and conductive segments 183, and a top view of a second board 186, showing additional conductive segments 183. Boards 185 and 186 are stacked as shown in FIG. 9, with board 186 above board 185. The four resistors R1, R2, R3, R4 are set forth in a straight line along the length of the board. A terminal 180 at one end of the series is connected to either the positive or negative lines 130A or 130B (as shown in FIG. 5) and an opposing terminal 187 to zero volts DC. Terminal 189 between R3 and R4 provides the low-voltage control signal on line 131. The capacitor series 181 is set forth in a straight line parallel to and spaced apart a predetermined distance "d" from the resistor series 182 along the length of the board. One end of the capacitor series is also tied to terminal 180 and the other end is tied to ground at terminal 188. A series of 15 diodes CR1, each one in parallel with one of the capacitors C2, are disposed along the length of the board adjacent to the capacitor series with opposing ends tied to the same end terminals as the capacitor series.

The resistor series 182 is divided into 15 portions 190 by two series of paired conductive segments which are disposed alternatively on opposing sides of the boards 185 and 186. As shown in FIG. 9, a first series of paired segments includes a first member 191 on the inner face of board 186 and a second member 192 on the outer face of board 185. A second series includes a third member 193 on the outer face of board 186 and a fourth member 194 on the inner face of board 185. By inner faces it is meant the surfaces 100, 101 of boards 185 and 186 adjacent one another, the opposing surfaces 102, 103 being the outer faces. The first and fourth members 191, 194 conductively engage the adjacent portions 190A, 190B of the resistor divider. The first and second members 191, 192 are conductively joined by a screw 105 extending through the boards. Likewise, the third and fourth members 193, 194 are joined by a screw 106 extending through the boards. A capacitor C2A is coupled between adjacent pairs of paired conductive segments 191, 192 and 193, 194 respectively by conductors 107, 108. The conductors 107, 108 are on opposing surfaces of board 185 and connect second member 192 and fourth member 194. In this manner, each shield pair (e.g., 191, 192) is tied dynamically to about the same potential as that part of the divider (e.g., 190A) it is shielding so that any stray capacitance which reaches the divider comes only from the adjacent shield pair (e.g., 193, 194) at nearly the same potential.

The predetermined distance d between the resistor series 182 and capacitor series 181, as well as the size and placement of the conductive segments 190, is determined by the values of the resistors R1, R2, R3 being used and the potentials being measured. Depending upon the frequency response and shielding characteristics desired, the physical location of the various components and the dimensions thereof are adjusted.

The voltage divider circuit additionally includes inductor L1. The combination of inductor L1 and capacitor series 181 forms a tuned circuit that limits the transient voltage rate applied to the power supply in the case of an X-ray tube arc-over. When an X-ray tube arcs over, the rise time of the high-voltage pulse may be on the order of a few nanoseconds. A voltage change with respect to time of such a high rate may damage the components in the high-voltage DC power supply. Therefore, to limit the transient voltage change with respect to time to a value that will not destroy the components in the power supply, the values of L1 and the capacitance of capacitor series 181 are selected to form a tuned circuit with a resonance frequency of approximately 100,000 Hz. The rise time of the transient voltage is thus limited to approximately 2.5 $\mu$s which is slow enough to protect components in the power supply. The tuned circuit does not absorb the transient voltage, but reduces its rise time so that it does not destroy a power supply component. The transient protection circuit including inductor L1, capacitor series 181, and diodes CR1 in effect changes the dV/dt to a rate that is slow enough to prevent damage to components in the high-voltage DC power supply.

A device identical to the shielded voltage divider 129 just described may likewise be provided at the output side of FET series 1 (identified as voltage divider 5 in FIG. 1). Where divider 5 includes the tuned circuit and diode protection (against voltage spikes and reversals of polarity), these elements protect both the regulator 91 and power supply 90 circuits and thus it is not necessary to repeat these elements in divider 129.

Having described a limited number of embodiments of the present invention, it should now be apparent to those skilled in the art that numerous embodiments and modifications are contemplated as falling within the scope of the present invention as defined by the appended claims.

I claim:

1. Apparatus for supplying operating power to an X-ray generating source comprising:

regulating means for receiving an input signal and regulating the duration and/or amplitude of the input signal to produce a high-voltage regulated output signal for operating an X-ray generating source, said regulating means including a plurality of solid-state switching means arranged in series, and feedback control means for controlling each of the switching means to produce the regulated output signal; and a shielded voltage divider circuit for measuring the regulated output signal and generating a feedback signal that is utilized by the feedback control means for selectively activating the switching means to cause the output voltage to approach a predetermined value, the shielded voltage divider circuit comprising resistor means, and a shield means for preventing electrical noise from interfering with the operation of the voltage divider; and wherein the resistor means has opposing end terminals and the shield means comprises:

a plurality of paired conductive members disposed along the length of the resistor means and having opposing end terminals, the pairs of conductive members separating the resistor means into separate portions by providing alternating first and second pairs of conductive members along the length of the resistor means;

a capacitor series comprising a plurality of serially-connected capacitor means disposed a predetermined distance from the resistor means and having opposing end terminals, each capacitor means being connected between adjacent first and second pairs of conductive members, the end terminals of the conductive members being connected to the end terminals of the capacitor series, and a dynamic impedance of the capacitor series being less than a dynamic impedance of the resistor means;

wherein when the end terminals of the resistor means are connected between a higher-voltage potential and a lower-voltage potential, and the end terminals of the capacitor series are connected between the higher-voltage potential and ground, electrical noise is coupled to the capacitor series and does not interfere with the resistor means.

2. Apparatus for supplying operating power to an X-ray generating source comprising:

a regulator circuit which receives an input signal and regulates at least one of a duration and an amplitude of the input signal to produce a high-voltage output signal for operating the X-ray generating source, said regulator circuit including a plurality of solid-state switches arranged in series and a feedback control circuit which controls each of the switches to produce the output signal; and;

a shielded voltage divider circuit which measures the output signal and generates a feedback signal utilized by the feedback control circuit to selectively activate the switches to cause the output signal to approach a predetermined value, the shielded voltage divider circuit comprising a resistor and a shield circuit which prevents electrical noise from interfering with the operation of the voltage divider; and wherein the shielded voltage divider circuit includes:

the resistor having a length between opposing end terminals; and the shield circuit having a plurality of paired conductive members disposed along the length of the resistor and having opposing end terminals, the pairs of conductive members separating the resistor into separate portions by providing alternating first and second pairs of conductive members along the length of the resistor.

3. The apparatus of claim 2 wherein the shielded voltage divider circuit further includes:

a capacitor series comprising a plurality of serially-connected capacitors disposed a predetermined distance from the resistor and having opposing end terminals, each capacitor being connected between adjacent first and second pairs of conductive members, the end terminals of the conductive members being connected to the end terminals of the capacitors, and wherein a dynamic impedance of the capacitor series is less than a dynamic impedance of the resistor.

4. The apparatus of claim 3, wherein the end terminals of the resistor are connected between a higher-voltage potential and a lower-voltage potential and the end terminals of the capacitor series are connected between the higher-voltage potential and ground, such that electrical noise is coupled to the capacitor series and the noise does not interfere with the resistor.

* * * * *